United States Patent [19]

Murashiro et al.

[11] Patent Number: 5,316,694
[45] Date of Patent: May 31, 1994

[54] ANTIFERROELECTRIC LIQUID CRYSTAL COMPOSITION

[75] Inventors: Katsuyuki Murashiro; Makoto Kikuchi; Shinichi Saito, all of Ichiharashi, Japan

[73] Assignee: Chisso Corporation, Osaka, Japan

[21] Appl. No.: 36,882

[22] Filed: Mar. 25, 1993

[30] Foreign Application Priority Data

Mar. 27, 1992 [JP] Japan .................................. 4-102041

[51] Int. Cl.⁵ ...................... C09K 19/34; C09K 19/52; C09K 19/12; G02F 1/13
[52] U.S. Cl. .......................... 252/299.61; 252/299.01; 252/299.64; 252/299.65; 252/299.66; 252/299.67; 359/103
[58] Field of Search ...................... 252/299.01, 299.61, 252/299.64, 299.65, 299.66, 299.67; 359/103, 104

[56] References Cited

U.S. PATENT DOCUMENTS

| | | | |
|---|---|---|---|
| 5,078,477 | 1/1992 | Jono et al. | 359/103 |
| 5,108,650 | 4/1992 | Koden et al. | 252/299.01 |
| 5,171,471 | 12/1992 | Suzuki et al. | 252/299.61 |
| 5,202,054 | 4/1993 | Suzuki et al. | 252/299.61 |
| 5,207,947 | 5/1993 | Suzuki et al. | 252/299.67 |

FOREIGN PATENT DOCUMENTS

| | | |
|---|---|---|
| 0327054 | 8/1989 | European Pat. Off. |
| 0345091 | 12/1989 | European Pat. Off. |
| 0411122 | 2/1991 | European Pat. Off. |
| 0418604 | 3/1991 | European Pat. Off. |
| 0466573 | 1/1992 | European Pat. Off. |
| 0525737 | 2/1993 | European Pat. Off. |
| 2199826 | 7/1988 | United Kingdom |

OTHER PUBLICATIONS

Nishiyama et al., "Antiferroelectric Chiral Smectic C Materials Having a 2-Alkyl Alkanoyl Group in the Chiral Part", Japanese Journal of Applied Physics, vol. 28, No. 12, pp. L2248-L2250 (1989).
Nippon Oil, Database WPIL, Week 9149, Derwent AN 91-357956 for JP-A-3239788.

*Primary Examiner*—Shean Wu
*Attorney, Agent, or Firm*—Wenderoth, Lind & Ponack

[57] ABSTRACT

An antiferroelectric liquid crystal composition comprising a first component comprising at least one compound expressed by the formula (I) and exhibiting no antiferroelectric phase, and a second component comprising at least one compound expressed by the formula (II) and exhibiting an antiferroelectric phase, the contents of the first component and the second component being respectively 1 to 40% and 60 to 99%, based upon the total weight of the two components:

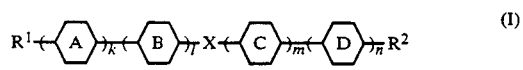

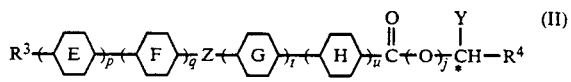

wherein in the formula (I), $R^1$ is 1-18C linear alkyl or alkoxy; $R^2$ is 1-18C alkyl or alkoxy; k, l, m and n are 0 or 1; (k+l) and (m+n) are 1 or 2, (k+l)+(m+n) are 2 or 3; X is —OCH$_2$—, —CH$_2$O—, —COO—, —OCO— or single bond; 6-membered rings A, B, C and D are 1,4-phenylene, pyridine-2,5-diyl, pyrimidine-2,5-diyl, pyrazine-2,5-diyl or pyridazine-3,6-diyl, one of the side-positioned hydrogen atoms of which may be replaced by halogen atom or CN, and in the formula (II), $R^3$ is 1-18C linear alkyl or alkoxy; $R^4$ is 2-18C alkyl or alkoxy; p, q, t and u are 0 or 1; (p+q) and (t+u) each are 1 or 2; (p+q)+(t+u) are 2 or 3; j is 0 or 1; Z is —COO—, —OCO—, —OCH$_2$—, —CH$_2$O—or single bond; Y is —CH$_3$; 6-membered rings E, F, G and H are 1,4-phenylene, pyridine-2,5-diyl, pyrimidine-2,5-diyl, pyrazine-2,5-diyl or pyridazine-3,6-diyl; * shows asymmetric carbon atom.

An antiferroelectric liquid crystal composition having the threshold voltage lowered at the time of transition from the antiferroelectric phase to ferroelectric phase accompanying the electric field impression in the antiferroelectric phase is provided, and a light-switching element which has a good contrast and can effect a tristable switching is obtained using the above composition.

2 Claims, 6 Drawing Sheets

ANTIFERROELECTRIC LIQUID CRYSTAL COMPOSITION

BACKGROUND OF THE INVENTION

1. Field of the Invention

This invention relates to a liquid crystal composition. More particularly it relates to an antiferroelectric liquid crystal composition and a light-switching element using the composition. Further, the present invention also relates to a process of reducing the threshold voltage of the antiferroelectric liquid crystal composition.

2. Description of the Related Art

Liquid crystal compositions have been broadly used as a display material. Most liquid crystal display elements are those of TN display mode and utilize nematic phase. TN display modes used for liquid crystal display are roughly classified into two areas. One of them is an active matrix mode having a switching transistor fixed onto each pixel. An example thereof uses a thin film transistor (TFT) and its display grade has reached a level matching that of CRT display, but it is difficult to make the size of the pictorial surface larger and also the cost is high.

The other mode is supertwisted nematic (STN) mode. This mode has been improved in the contrast and the width of viewing angle as compared with conventional, simple matrix mode, but the display grade has not yet reached the level of CRT display. However, the cost is not so high. Thus, these two modes have merits and demerits when the display grade and production cost are taken into consideration.

About ten years ago, a display mode using a ferroelectric liquid crystal (abbreviated to FLC) has appeared in expectation of solving the problems of the above two modes. At present, the liquid crystal referred to merely as FLC indicates a surface-stabilized ferroelectric liquid crystal (abbreviated to SSFLC). This SSFLC has been proposed by N. A. Clark and S. T. Lagewall (see Appl. Phys. Lett., Vol. 36, page 899 (1980)). Since then, it has been referred to as a liquid crystal display of the next generation and various researches and developments have been advanced. The reason is that the ferroelectric liquid crystal element has the following specific features:

(1) quick response
(2) exhibition of memory properties and
(3) broad viewing angle.

Due to these specific features, a SSFLC mode is expected to produce a potential high density display which is very interesting as a display device. However, as the researches have been advanced, the following problems to be solved have been revealed:

(i) inferior switching and ghost effect,
(ii) inferior stability to mechanical shock,
(iii) reduction in the brightness and contrast due to occurrence of chevron structure; etc.

As a method for solving these problems of SSFLC, an antiferroelectric liquid crystal display element has been noted. The antiferroelectric liquid crystal has been found by Furukawa et al for the first time in terms of SY* phase (see Ferroelectrics, Vol. 85, page 451 (1988)). Thereafter, it has been advocated by Chandani et al that the above phase is antiferroelectric (see Japanese J. of Appl. Phys., vol. 28, page 1265 (1989)), and this view has now been generally accepted.

The antiferroelectric liquid crystal display element utilizes a tristable switching in the antiferroelectric phase. The tristable switching refers to a switching among three states of the bistable state in the ferroelectric state at the time of impression of electric field and an antiferroelectric state at the time of no impression of electric field.

The specific features of the antiferroelectric liquid crystal element consist in that when transition is effected between the antiferroelectric state and the ferroelectric state, steep threshold value characteristics and an optical hysteresis having a broad width are exhibited, and by utilizing the specific features, it is possible to expect a display having a viewing angle to an extent similar to that of SSFLC and also having a high display contrast.

As to the antiferroelectric phase, those of chiral smectic C phase (abbreviated to SC* phase) and chiral smectic I phase (abbreviated to SI* phase) have been reported at present, but an antiferroelectric phase of chiral smectic F phase, too, may be existent in the aspect of its structure. The tristable switching is possible in whatever phase, as far as the phase is an antiferroelectric phase. However, in view of the response rate, an antiferroelectric phase of SC* phase (abbreviated to $SC_A^*$ phase) is preferred. In 1989, an antiferroelectric liquid crystal display has been experimentally prepared by Yamawaki et al (see JAPAN DISPLAY, '89 Collected Preprints 3—3, page 26), and it has come to be quickly recognized.

However, the current antiferroelectric liquid crystal materials still yet have the following problems:

(a) The liquid crystal element has a high driving voltage.
(b) The temperature-dependency of the hysteresis characteristics is large.

The high driving voltage is due to the fact that the antiferroelectric liquid crystal composition has a high threshold voltage. The threshold voltage referred to herein means an electric field intensity to initiate a phase transition from the antiferroelectric phase to a ferroelectric phase by imparting a voltage to an antiferroelectric liquid crystal. The mechanism of occurrence of the threshold voltage has not yet been clarified. Further, no investigation on factors having an influence upon the threshold voltage has ever been reported other than the one made by the present inventors (see the 17th Liquid Crystal Symposium, Collected, Preprints, page 260 (1991)).

The present invention is intended to solve the problem described in the item (a) among the above items, and its first object is to reduce the threshold voltage at the time of transition from the antiferroelectric phase to a ferroelectric phase accompanying impression of an electric field, in a $SC_A^*$ phase, and its second object is to provide a light-switching element actuated by a low driving voltage.

SUMMARY OF THE INVENTION

The first object of the present invention is achieved by the item (1) mentioned below. The embodiments of the present invention are shown in the items (2) to (5) mentioned below. The second object is achieved by the item (6) mentioned below.

(1) An antiferroelectric liquid crystal composition comprising at least two components, the first component of which is expressed by the following formula (I) and comprises at least one compound having no antiferroelectric phase, and the second component of which is expressed by the following formula (II) and comprises at least one compound having an antiferroelectric phase, the content of said first component being 1 to 40% and that of said second component being 60 to 99%, the respective contents being based upon the total weight of the first component and the second component:

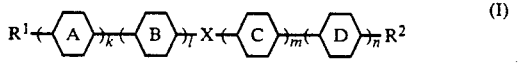

wherein $R^1$ represents a linear alkyl group or alkoxy group of 1 to 18 carbon atoms; $R^2$ represents an alkyl group or alkoxy group of 1 to 18 carbon atoms; k, l and m each represent 0 or 1; (k+l) and (m+n) each represent 1 or 2, (k+l)+(m+n) represents 2 or 3, X represents —OCH$_2$—, —CH$_2$O—, —COO—, —OCO— or a single bond; six-membered rings A, B, C and D each independently represent 1,4-phenylene, pyridine-2,5-diyl, pyrimidine-2,5-diyl, pyrazine-2,5-diyl or pyridazine-3,6-diyl, one of the side-positioned hydrogen atoms of which may be substituted by a halogen atom or cyano group, and

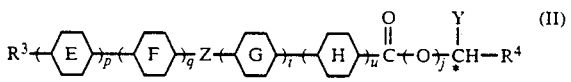

wherein $R^3$ represents a linear alkyl group or alkoxy group of 1 to 18 carbon atoms; $R^4$ represents an alkyl group or alkoxy group of 2 to 18 carbon atoms; p, q, t and u each represent 0 or 1; (p+q) and (t+u) each represent 1 or 2, (p+q)+(t+u) represents 2 or 3; j represents 0 or 1; Z represents —COO—, —OCO—, —OCH$_2$—, —CH$_2$O— a single bond; Y represents —CH$_3$; six-membered rings E, F, G and H each independently represent 1,4-phenylene, pyridine-2,5-diyl,-pyrimidine-2,5-diyl, pyrazine-2,5-diyl or pyridazine-3,6-diyl, one of the side-positioned hydrogen atoms of which may be substituted by a halogen atom or cyano group; and the symbol * represents an asymmetric carbon atom.

(2) An antiferroelectric liquid crystal composition according to item (1), wherein said first component is at least one compound selected from the group consisting of compounds expressed by the following formula (I-1) or (I-2):

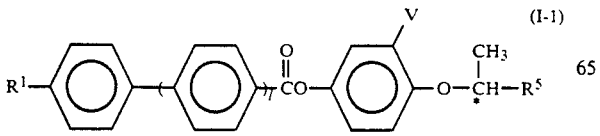

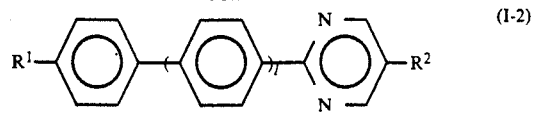

wherein $R^1$ represents a linear alkyl group or alkoxy group of 1 to 18 carbon atoms; $R^2$ represents an alkyl group or alkoxy group of 1 to 18 carbon atoms; $R^5$ represents an alkyl group or alkoxy group of 2 to 18 carbon atoms; V represents hydrogen atom, a halogen atom or cyano group; and l represents 0 or 1.

(3) An antiferroelectric liquid crystal composition according to item (1), wherein said second component is at least one compound selected from the group consisting of compounds expressed by the following formula (II-1) or (II-2):

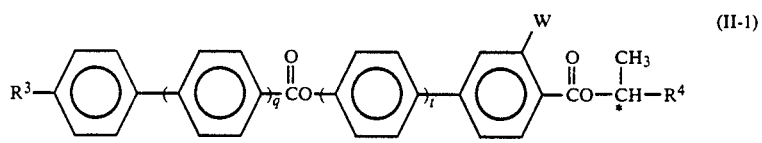

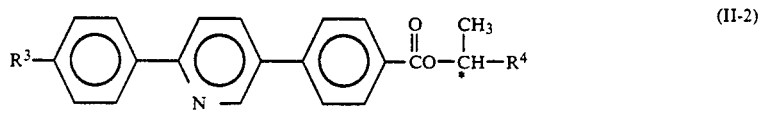

wherein $R^3$ represents a linear alkyl group or alkoxy group of 1 to 18 carbon atoms; $R^4$ represents an alkyl group or alkoxy group of 2 to 18 carbon atoms; W represents hydrogen atom, a halogen atom or cyano group; q and t each represent 0 or 1; and the symbol * represents an asymmetric carbon atom.

(4) An antiferroelectric liquid crystal composition according to item (1), wherein said first component is at least one compound selected from the group consisting of compounds expressed by the following formula (I-1) or (I-2), and said second component is at least one compound selected from the group consisting of compounds expressed by the following formula (II-1) or (II-2):

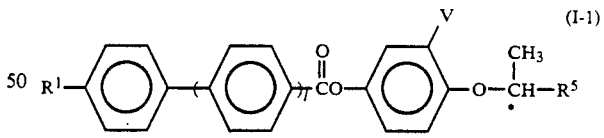

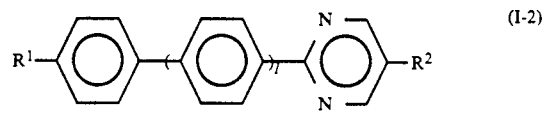

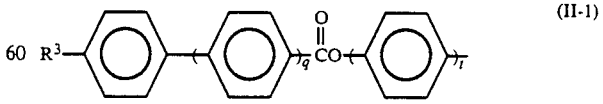

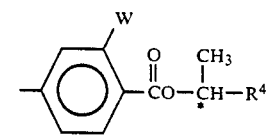

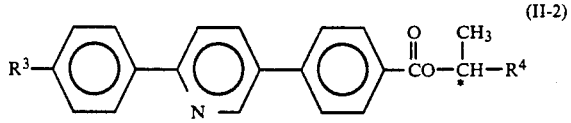
(II-2)

wherein R¹ represents a linear alkyl group or alkoxy group of 1 to 18 carbon atoms; R² represents an alkyl group or alkoxy group of 1 to 18 carbon atoms; R³ represents a linear alkyl group or alkoxy group of 1 to 18 carbon atoms; R⁴ represents an alkyl group or alkoxy group of 2 to 18 carbon atoms; R⁵ represents an alkyl group or alkoxy group of 2 to 18 carbon atoms; V and W each independently represent hydrogen atom, a halogen atom or cyano group; l, q and t each represent 0 or 1; and the symbol * represents an asymmetric carbon atom.

(5) An antiferroelectric liquid crystal composition according to item (1), comprising as said first component, 1 to 30% by weight of at least one compound selected from the group consisting of compounds expressed by the following formula (I-1) or (I-2), as said second component, 30 to 94% by weight of at least one compound selected from the group consisting of compounds expressed by the following formula (II-1), and also as said second component, 5 to 40% by weight of at least one compound selected from the group consisting of compounds expressed by the following formula (II-2):

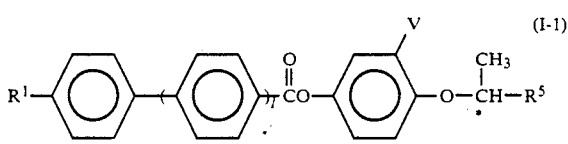
(I-1)

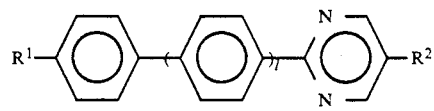
(I-2)

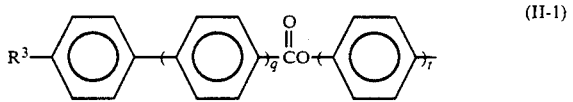
(II-1)

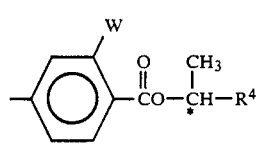

(II-2)

wherein R¹ represents a linear alkyl group or alkoxy group of 1 to 18 carbon atoms; R² represents an alkyl group or alkoxy group of 1 to 18 carbon atoms; R³ represents a linear alkyl group or alkoxy group of 1 to 18 carbon atoms; R⁴ represents an alkyl group or alkoxy group of 2 to 18 carbon atoms; R⁵ represents an alkyl group or alkoxy group of 2 to 18 carbon atoms; V and W each independently represent hydrogen atom, a halogen atom or cyano group; l, q and t each represent 0 or 1, and the symbol * represents an asymmetric carbon atom.

(6) A light-switching element characterized by using an antiferroelectric liquid crystal composition according to any one of items (1) to (5).

The present invention is further directed to item (7) mentioned below and its embodiment is described in item (8).

(7) A method for reducing a threshold voltage of a phase transition from an antiferroelectric phase to a ferroelectric phase, which comprises:

mixing a compound expressed by formula (I) mentioned below and having no antiferroelectric phase with an antiferroelectric liquid crystal composition containing as an antiferroelectric liquid crystal component, at least one compound having an antiferroelectric phase, the proportion of the former compound being 1 to 66 % by weight based upon the weight of the antiferroelectric liquid crystal component:

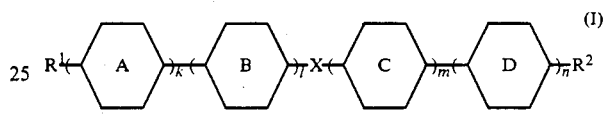
(I)

wherein R¹ represents a linear alkyl group or alkoxy group of 1 to 18 carbon atoms; R² represents an alkyl group or alkoxy group of 1 to 18 carbon atoms; k, l, m and n each represent 0 or 1; (k+l) and (m+n) each represent 1 or 2; (k+l)+(m+n) represents 2 or 3; X represents —OCH₂—, —CH₂O—, —COO—, —OCO— or a single bond; and six-membered rings A, B, C and D each independently represent 1,4-phenylene, pyridine-2,5-diyl, pyrimidine-2,5-diyl,pyrazine-2,5-diyl or pyridazine-3,6-diyl, one of the side-positioned hydrogen atoms of which may be substituted by a halogen atom or cyano group.

(8) A method according to item (7), wherein said at least one compound having an antiferroelectric phase is expressed by the formula (II)

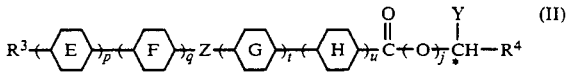
(II)

wherein R³ represents a linear alkyl group or alkoxy group of 1 to 18 carbon atoms; R⁴ represents an alkyl group or alkoxy group of 2 to 18 carbon atoms; p, q, t and u each represent 0 or 1; (p+q) and (t+u) each represent 1 or 2; (p+q)+(t+u) represents 2 or 3; j represents 0 or 1; Z represents —COO—, —OCO—, —OCH₂—, —CH₂O— or a single bond; Y represents —CH₃; six-membered rings E, F, G and H each independently represent 1,4-phenylene, pyridine-2,5-diyl, pyrimidine-2,5-diyl, pyrazine-2,5-diyl or pyridazine-3,6-diyl, one of the side-positioned hydrogen atoms of which may be substituted by a halogen atom or cyano group; and the symbol * represents an asymmetric carbon atom.

DETAILED DESCRIPTION OF PREFERRED EMBODIMENTS

Figure 1:
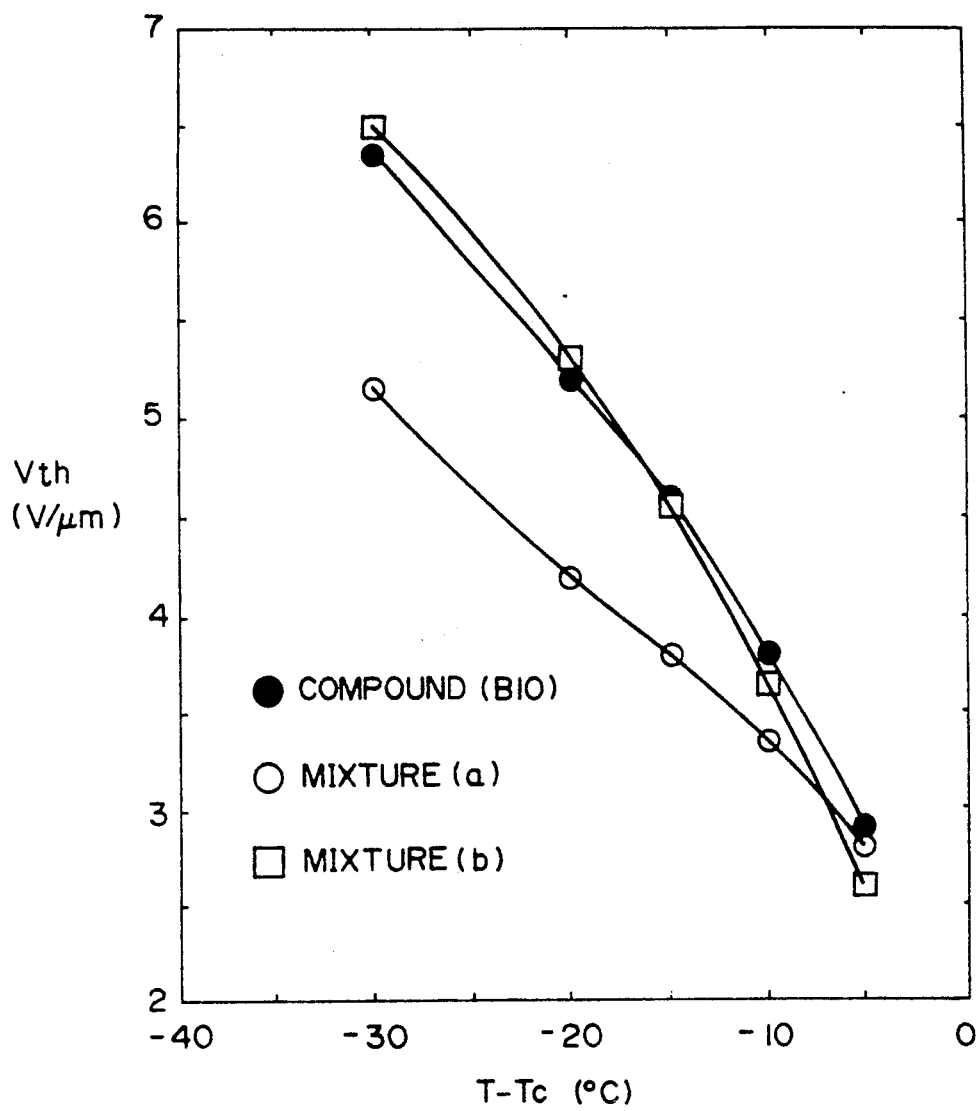
FIGS. 1 to 6 respectively show a view illustrating the temperature-dependency of the threshold voltage at the time of transition from the antiferroelectric phase to the ferroelectric phase in the SC$_A$* phase of an antiferroelectric liquid crystal composition as an embodiment of the present invention. In these figures, for comparison, the threshold voltage of an antiferroelectric liquid crystal deficient in the second component in the present invention is also illustrated together therein.

Besides ferroelectric liquid crystal compounds having no antiferroelectric phase, nematic or smectic C (abbreviated to SC) liquid crystal compounds may be employed as the first component in the present invention, which nematic or SC compounds are known as an additive for SSFLC mixture for broadening a mesomorphic range or for reducing viscosity of a resulting mixture.

It is also possible to use, as the first component, compounds which have a similar chemical structure to those nematic or SC compounds but have no mesomorphic phase.

Among these compounds, compounds of the formula (I) wherein $R^1$ represents a linear alkyl or alkoxy group of 4 to 14 carbon atoms and $R^2$ represents an alkyl or alkoxy group of 3 to 16 carbon atoms, are preferable. As the six-membered -A-B- or -C-D-, the following rings having a divalent group are preferable:

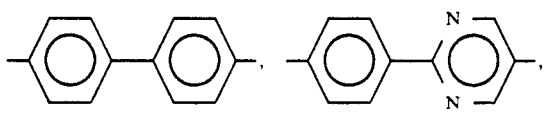

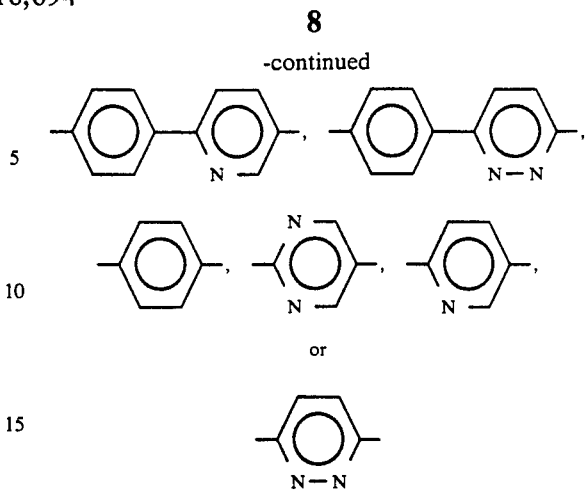

Among these compounds, those having a single heterocyclic ring or no heterocyclic ring are preferable to those having two heterocyclic rings.

As more preferable compounds as the first component, compounds expressed by the above formula (I-1) or (I-2) and having no antiferroelectric phase can be mentioned. Among these compounds, those of the formula (I-1) wherein $R^1$ represents a linear alkyl or alkoxy group of 4 to 14 carbon atoms are preferable, and those of the above formula wherein $R^5$ represents a linear alkyl group of 3 to 8 carbon atoms are preferable. Further, those of the formula (I-2) wherein $R^1$ represents a linear alkyl group or alkoxy group of 5 to 14 carbon atoms and $R^2$ represents a linear alkyl group or alkoxy group of 6 to 16 carbon atoms are preferable.

Examples of preferable compounds expressed by the formula (I-1) are as follows:

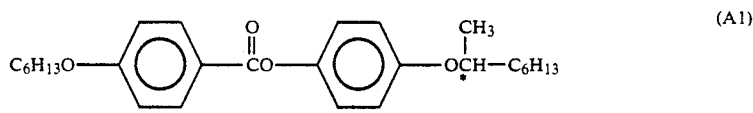
(A1)

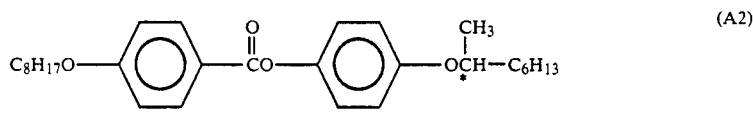
(A2)

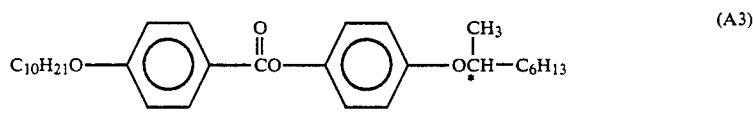
(A3)

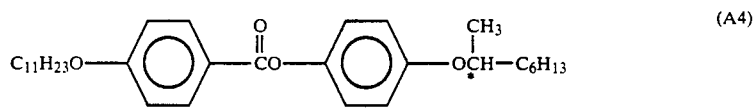
(A4)

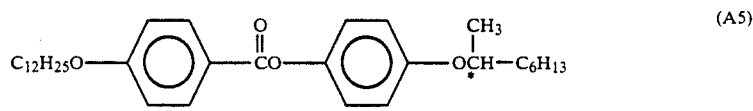
(A5)

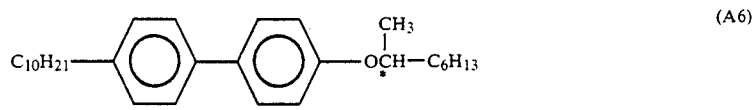
(A6)

-continued
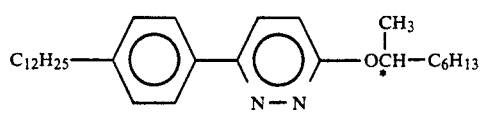
(A7)
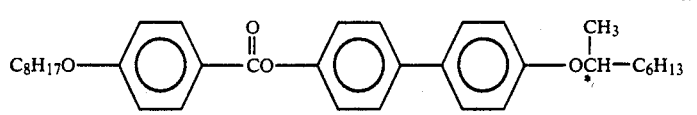
(A8)
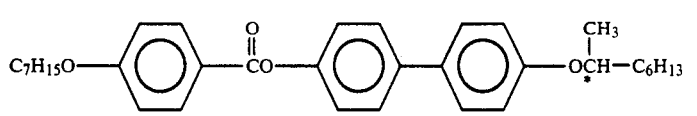
(A9)
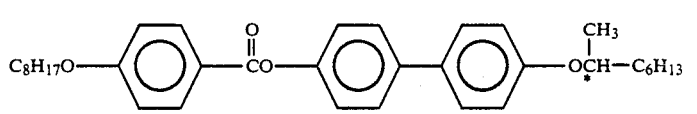
(A10)
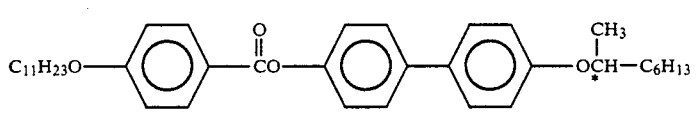
(A11)
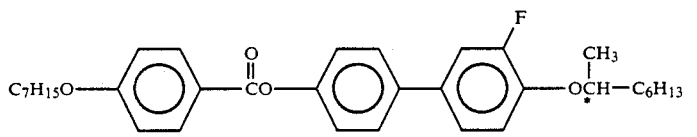
(A12)
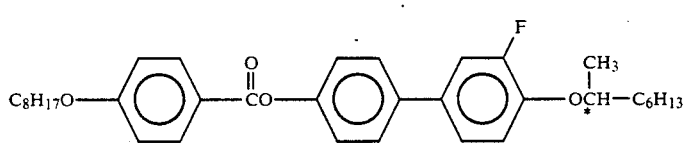
(A13)
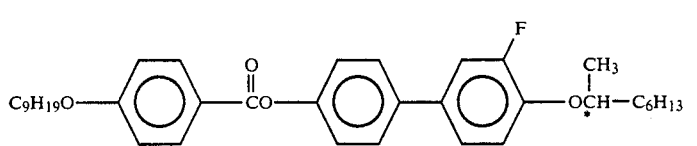
(A14)
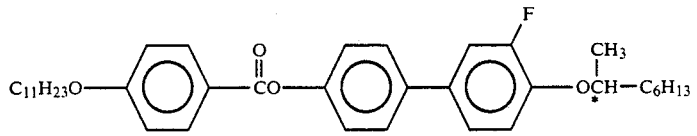
(A15)
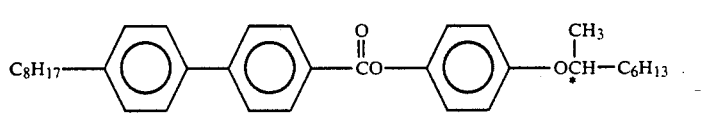
(A16)
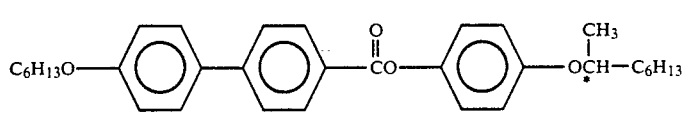
(A17)
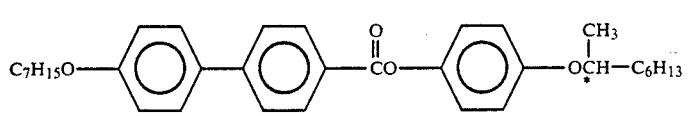
(A18)
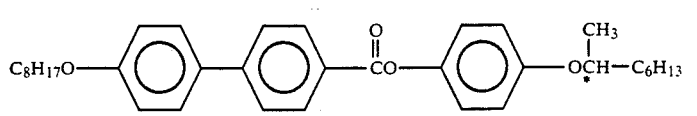
(A19)

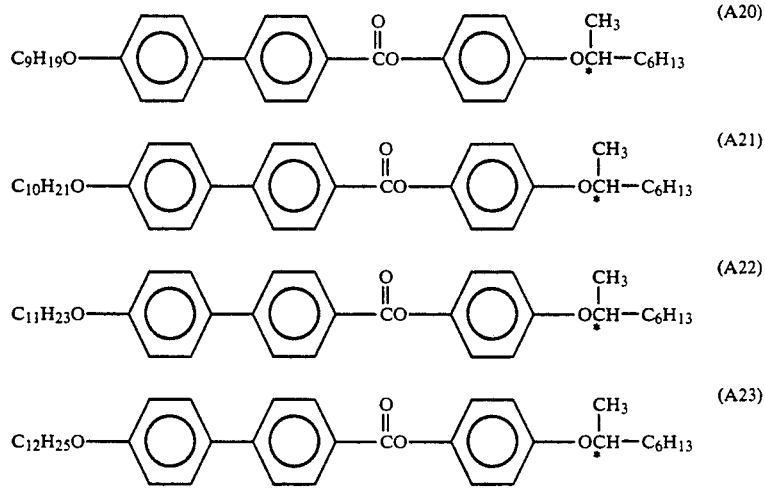

Further, examples of preferable compounds expressed by the formula (I-2) are shown in Tables 1 to 5:

TABLE 1

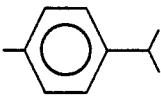

Compound expressed by $R^1$—⌬—⌬—$R^2$ (pyridine with one N)

| $R^1$ | $R^2$ | $R^1$ | $R^2$ |
|---|---|---|---|
| $C_6H_{13}O-$ | $C_8H_{17}-$ | $C_{12}H_{25}-$ | $C_7H_{15}O-$ |
| $C_6H_{13}O-$ | $C_9H_{19}-$ | $C_{12}H_{25}-$ | $C_8H_{17}O-$ |
| $C_6H_{13}O-$ | $C_{10}H_{21}-$ | $C_6H_{13}-$ | $C_7H_{15}O-$ |
| $C_6H_{13}O-$ | $C_{11}H_{23}-$ | $C_6H_{13}-$ | $C_8H_{17}O-$ |
| $C_7H_{15}O-$ | $C_9H_{19}-$ | $C_6H_{13}-$ | $C_9H_{19}O-$ |
| $C_7H_{15}O-$ | $C_{10}H_{21}-$ | $C_6H_{13}-$ | $C_{10}H_{21}O-$ |
| $C_7H_{15}O-$ | $C_{11}H_{23}-$ | $C_6H_{13}-$ | $C_{11}H_{23}O-$ |
| $C_8H_{17}O-$ | $C_8H_{17}-$ | $C_6H_{13}-$ | $C_{12}H_{25}O-$ |
| $C_8H_{17}O-$ | $C_9H_{19}-$ | $C_6H_{13}-$ | $C_{13}H_{27}O-$ |
| $C_8H_{17}O-$ | $C_{10}H_{21}-$ | $C_6H_{13}-$ | $C_{14}H_{29}O-$ |
| $C_8H_{17}O-$ | $C_{11}H_{23}-$ | $C_6H_{13}-$ | $C_{15}H_{31}O-$ |
| $C_9H_{19}O-$ | $C_7H_{15}-$ | $C_7H_{15}-$ | $C_7H_{15}O-$ |
| $C_9H_{19}O-$ | $C_8H_{17}-$ | $C_7H_{15}-$ | $C_8H_{17}O-$ |
| $C_9H_{19}O-$ | $C_9H_{19}-$ | $C_7H_{15}-$ | $C_9H_{19}O-$ |
| $C_9H_{19}O-$ | $C_{10}H_{21}-$ | $C_7H_{15}-$ | $C_{10}H_{21}O-$ |
| $C_{10}H_{21}O-$ | $C_8H_{17}-$ | $C_7H_{15}-$ | $C_{11}H_{23}O-$ |
| $C_{11}H_{23}O-$ | $C_7H_{15}-$ | $C_7H_{15}-$ | $C_{12}H_{25}O-$ |
| $C_{11}H_{23}O-$ | $C_8H_{17}-$ | $C_8H_{17}-$ | $C_7H_{15}O-$ |

TABLE 2

Compound expressed by $R^1$—⌬—⌬—$R^2$ (pyrimidine)

| $R^1$ | $R^2$ | $R^1$ | $R^2$ |
|---|---|---|---|
| $C_8H_{17}-$ | $C_8H_{17}O-$ | $C_5H_{11}O-$ | $C_7H_{15}O-$ |
| $C_8H_{17}-$ | $C_9H_{19}O-$ | $C_5H_{11}O-$ | $C_8H_{17}O-$ |
| $C_8H_{17}-$ | $C_{10}H_{21}O-$ | $C_5H_{11}O-$ | $C_9H_{19}O-$ |
| $C_8H_{17}-$ | $C_{11}H_{23}O-$ | $C_5H_{11}O-$ | $C_{10}H_{21}O-$ |
| $C_8H_{17}-$ | $C_{12}H_{25}O-$ | $C_5H_{11}O-$ | $C_{11}H_{23}O-$ |
| $C_8H_{17}-$ | $C_{13}H_{27}O-$ | $C_5H_{11}O-$ | $C_{12}H_{25}O-$ |
| $C_9H_{19}-$ | $C_8H_{17}O-$ | $C_6H_{13}O-$ | $C_6H_{13}O-$ |
| $C_9H_{19}-$ | $C_9H_{19}O-$ | $C_6H_{13}O-$ | $C_7H_{15}O-$ |
| $C_9H_{19}-$ | $C_{10}H_{21}O-$ | $C_6H_{13}O-$ | $C_8H_{17}O-$ |
| $C_9H_{19}-$ | $C_{11}H_{23}O-$ | $C_6H_{13}O-$ | $C_9H_{19}O-$ |
| $C_9H_{19}-$ | $C_{12}H_{25}O-$ | $C_6H_{13}O-$ | $C_{10}H_{21}O-$ |
| $C_9H_{19}-$ | $C_{13}H_{27}O-$ | $C_6H_{13}O-$ | $C_{11}H_{23}O-$ |
| $C_{10}H_{21}-$ | $C_8H_{17}O-$ | $C_6H_{13}O-$ | $C_{12}H_{25}O-$ |
| $C_{10}H_{21}-$ | $C_9H_{19}O-$ | $C_7H_{15}O-$ | $C_6H_{13}O-$ |
| $C_{10}H_{21}-$ | $C_{10}H_{21}O-$ | $C_7H_{15}O-$ | $C_7H_{15}O-$ |
| $C_{10}H_{21}-$ | $C_{11}H_{23}O-$ | $C_7H_{15}O-$ | $C_8H_{17}O-$ |
| $C_{10}H_{21}-$ | $C_{12}H_{25}O-$ | $C_7H_{15}O-$ | $C_9H_{19}O-$ |
| $C_5H_{11}O-$ | $C_6H_{13}O-$ | $C_7H_{15}O-$ | $C_{10}H_{21}O-$ |

TABLE 3

Compound expressed by $R^1$—⌬—⌬—$R^2$

| $R^1$ | $R^2$ | $R^1$ | $R^2$ |
|---|---|---|---|
| $C_7H_{15}O-$ | $C_{11}H_{23}O-$ | $C_{10}H_{21}O-$ | $C_8H_{17}O-$ |
| $C_7H_{15}O-$ | $C_{12}H_{25}O-$ | $C_{10}H_{21}O-$ | $C_9H_{19}O-$ |
| $C_8H_{17}O-$ | $C_6H_{13}O-$ | $C_{10}H_{21}O-$ | $C_{10}H_{21}O-$ |
| $C_8H_{17}O-$ | $C_7H_{15}O-$ | $C_{10}H_{21}O-$ | $C_{11}H_{23}O-$ |
| $C_8H_{17}O-$ | $C_8H_{17}O-$ | $C_{10}H_{21}O-$ | $C_{12}H_{25}O-$ |
| $C_8H_{17}O-$ | $C_9H_{19}O-$ | $C_{11}H_{23}O-$ | $C_6H_{13}O-$ |
| $C_8H_{17}O-$ | $C_{10}H_{21}O-$ | $C_{11}H_{23}O-$ | $C_7H_{15}O-$ |
| $C_8H_{17}O-$ | $C_{11}H_{23}O-$ | $C_{11}H_{23}O-$ | $C_8H_{17}O-$ |
| $C_8H_{17}O-$ | $C_{12}H_{25}O-$ | $C_{11}H_{23}O-$ | $C_9H_{19}O-$ |
| $C_9H_{19}O-$ | $C_6H_{13}O-$ | $C_{11}H_{23}O-$ | $C_{10}H_{21}O-$ |
| $C_9H_{19}O-$ | $C_7H_{15}O-$ | $C_{11}H_{23}O-$ | $C_{11}H_{23}O-$ |
| $C_9H_{19}O-$ | $C_8H_{17}O-$ | $C_{11}H_{23}O-$ | $C_{12}H_{25}O-$ |
| $C_9H_{19}O-$ | $C_9H_{19}O-$ | $C_{11}H_{23}O-$ | $C_{16}H_{33}O-$ |
| $C_9H_{19}O-$ | $C_{10}H_{21}O-$ | $C_{12}H_{25}O-$ | $C_6H_{13}O-$ |
| $C_9H_{19}O-$ | $C_{11}H_{23}O-$ | $C_{12}H_{25}O-$ | $C_7H_{15}O-$ |
| $C_9H_{19}O-$ | $C_{12}H_{25}O-$ | $C_{12}H_{25}O-$ | $C_8H_{17}O-$ |
| $C_{10}H_{21}O-$ | $C_6H_{13}O-$ | $C_{12}H_{25}O-$ | $C_9H_{19}O-$ |
| $C_{10}H_{21}O-$ | $C_7H_{15}O-$ | $C_{12}H_{25}O-$ | $C_{10}H_{21}O-$ |

TABLE 2-continued

| $R^1$ | $R^2$ | $R^1$ | $R^2$ |
|---|---|---|---|
| $C_{10}H_{21}-$ | $C_{11}H_{23}O-$ | $C_7H_{15}O-$ | $C_8H_{17}O-$ |
| $C_{10}H_{21}-$ | $C_{12}H_{25}O-$ | $C_7H_{15}O-$ | $C_9H_{19}O-$ |
| $C_5H_{11}O-$ | $C_6H_{13}O-$ | $C_7H_{15}O-$ | $C_{10}H_{21}O-$ |

TABLE 4

| $R^1$ | $R^2$ | $R^1$ | $R^2$ |
|---|---|---|---|
| $C_{12}H_{25}O-$ | $C_{12}H_{25}O-$ | $C_8H_{17}-$ | $C_{12}H_{25}-$ |
| $C_{12}H_{25}O-$ | $C_{16}H_{33}O-$ | $C_8H_{17}-$ | $C_{14}H_{29}-$ |
| $C_7H_{15}-$ | $C_9H_{19}-$ | $C_9H_{19}-$ | $C_{10}H_{21}-$ |
| $C_7H_{15}-$ | $C_{10}H_{21}-$ | $C_9H_{19}-$ | $C_{12}H_{25}-$ |

TABLE 4-continued

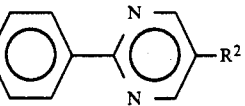

Compound expressed by $R^1$—⬡—⬡(N,N)—$R^2$

| $R^1$ | $R^2$ | $R^1$ | $R^2$ |
|---|---|---|---|
| $C_7H_{15}-$ | $C_{11}H_{23}-$ | $C_{10}H_{21}-$ | $C_{10}H_{21}-$ |
| $C_7H_{15}-$ | $C_{12}H_{25}-$ | $C_{10}H_{21}-$ | $C_{11}H_{23}-$ |
| $C_7H_{15}-$ | $C_{14}H_{29}-$ | $C_{10}H_{21}-$ | $C_{12}H_{25}-$ |
| $C_8H_{17}-$ | $C_9H_{19}-$ | $C_{12}H_{25}-$ | $C_{11}H_{23}-$ |
| $C_8H_{17}-$ | $C_{10}H_{21}-$ | $C_{12}H_{25}-$ | $C_{12}H_{25}-$ |
| $C_8H_{17}-$ | $C_{11}H_{23}-$ | | |

TABLE 5

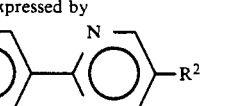

Compound expressed by
$R^1$—⬡—⬡—⬡(N,N)—$R^2$

| $R^1$ | $R^2$ | $R^1$ | $R^2$ |
|---|---|---|---|
| $C_5H_{11}-$ | $C_6H_{13}-$ | $C_5H_{11}O-$ | $C_6H_{13}-$ |
| $C_5H_{11}-$ | $C_7H_{15}-$ | $C_5H_{11}O-$ | $C_7H_{15}-$ |
| $C_5H_{11}-$ | $C_8H_{17}-$ | $C_5H_{11}O-$ | $C_8H_{17}-$ |
| $C_6H_{13}-$ | $C_6H_{13}-$ | $C_6H_{13}O-$ | $C_6H_{13}-$ |
| $C_6H_{13}-$ | $C_7H_{15}-$ | $C_6H_{13}O-$ | $C_7H_{15}-$ |
| $C_6H_{13}-$ | $C_8H_{17}-$ | $C_6H_{13}O-$ | $C_8H_{17}-$ |
| $C_7H_{15}-$ | $C_6H_{13}-$ | $C_7H_{15}O-$ | $C_6H_{13}-$ |
| $C_7H_{15}-$ | $C_7H_{15}-$ | $C_7H_{15}O-$ | $C_7H_{15}-$ |
| $C_7H_{15}-$ | $C_8H_{17}-$ | $C_7H_{15}O-$ | $C_8H_{17}-$ |
| $C_8H_{17}-$ | $C_6H_{13}-$ | $C_8H_{17}O-$ | $C_6H_{13}-$ |
| $C_8H_{17}-$ | $C_7H_{15}-$ | $C_8H_{17}O-$ | $C_7H_{15}-$ |
| $C_8H_{17}-$ | $C_8H_{17}-$ | $C_8H_{17}O-$ | $C_8H_{17}-$ |

Most of compounds having an antiferroelectric phase so far reported, are those having a chemical structure obtained by bonding an alkyl group having a chiral carbon atom at its terminal to a six-membered ring at the terminal of the core part, by means of —COO— or —CO—. The compound having an antiferroelectric phase, used as the second component in the present invention, too, is a compound obtained by bonding an alkyl group having a chiral carbon atom at its terminal to a carbon atom of a six-membered ring at the terminal of the core part, by means of —COO— or —CO—.

On the other hand, the compound used as a preferable compound having no antiferroelectric phase for the first component is characterized by a chemical structure wherein —COO— or —CO— is absent, in the bonding of an alkyl group having a chiral carbon at its terminal, to a carbon atom of a six-membered ring at the terminal of the core part. A preferable compound as the first component has —O— in place of the above bonding groups, as a bonding group between a carbon of the six-membered ring and the chiral carbon atom.

As the compound having an antiferroelectric phase as the second component of the present invention, those of the formula (II) wherein $R^3$ represents a linear alkyl group or alkoxy group of 4 to 14 carbon atoms are preferable and those of the formula (II) wherein $R^4$ represents a linear alkyl group of 3, 4, 6 or 8 carbon atoms are preferable. Further, as the six-membered ring -E-F- or -G-H- as the core part in the formula (II), those having the following divalent group are preferable:

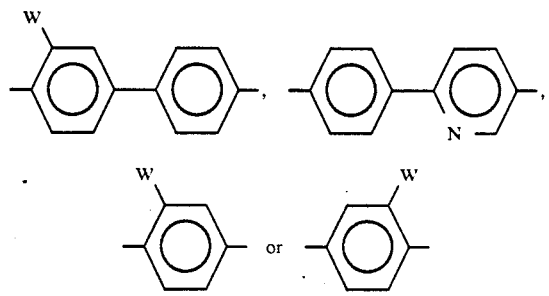

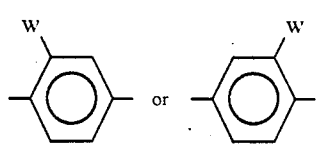

wherein W represents hydrogen atom or a halogen atom.

Among these compounds, examples of those used preferably are compounds expressed by the formula (II-1) or (II-2). Further, among these compounds, those of these formulas wherein $R^4$ represents a linear alkyl group of 3, 4, 6 or 8 carbon atoms are preferable, and compounds of the formulas wherein $R^4$ represents hexyl are more preferable. Concrete examples of compounds preferably used as the second component in the present invention are as follows:

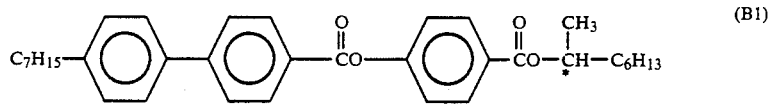

(B1)

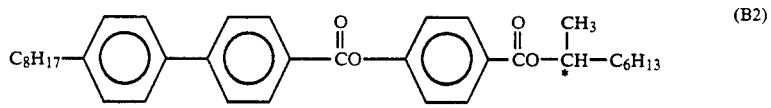

(B2)

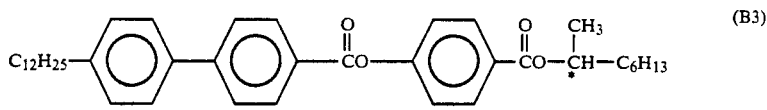

(B3)

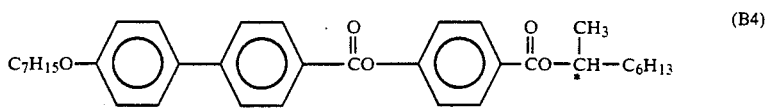

(B4)

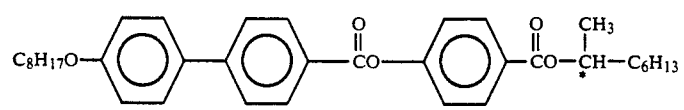
(B5)
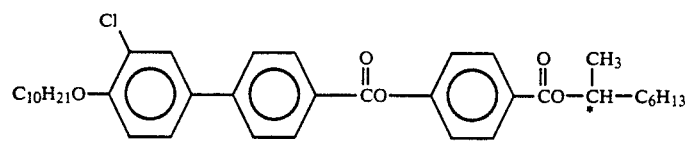
(B6)
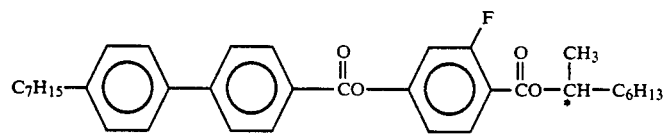
(B7)
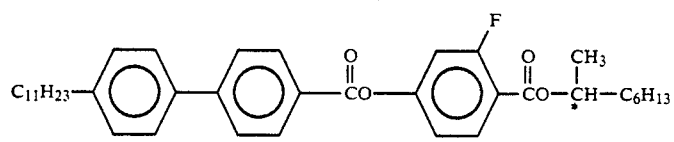
(B8)
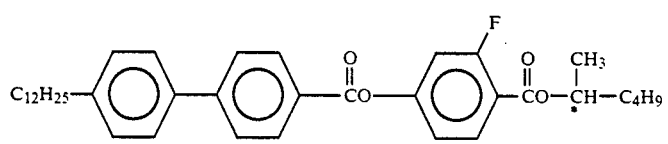
(B9)
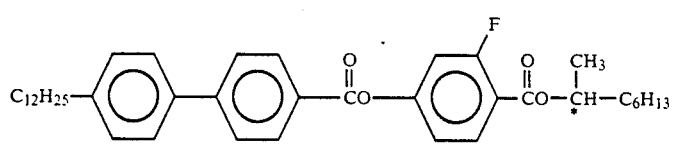
(B10)
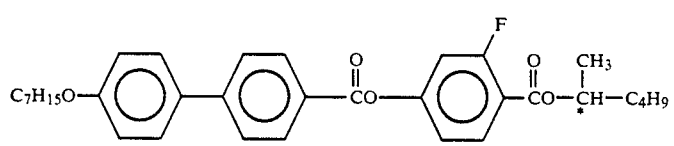
(B11)
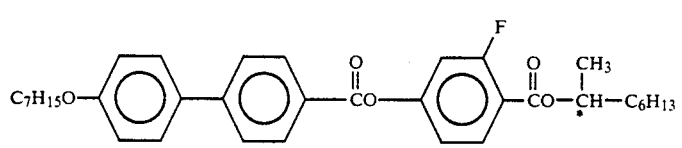
(B12)
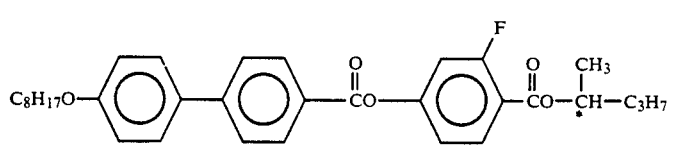
(B13)
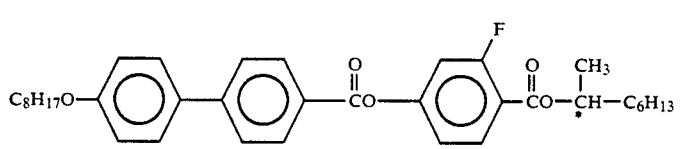
(B14)
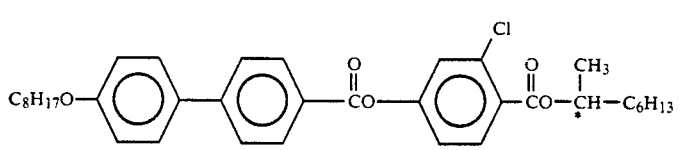
(B15)

-continued
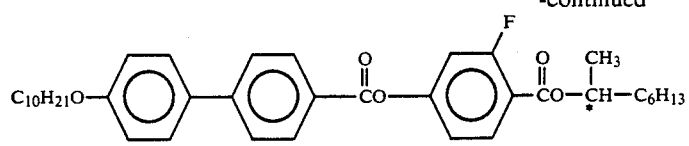
(B16)
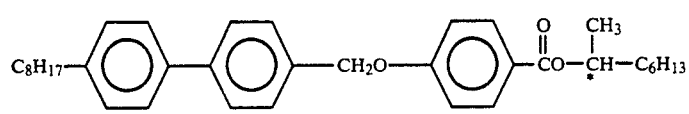
(B17)
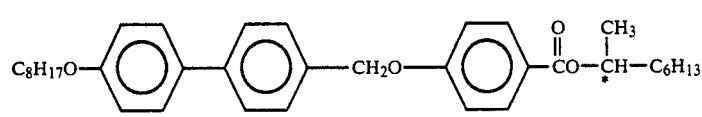
(B18)
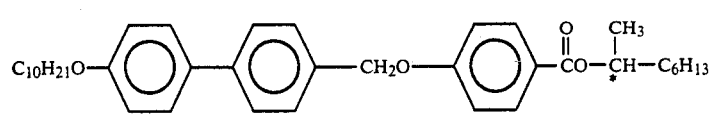
(B19)
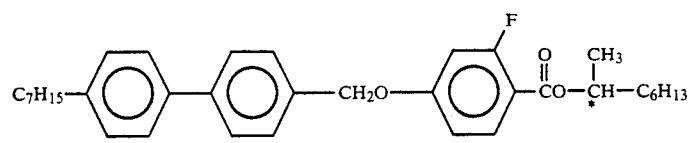
(B20)
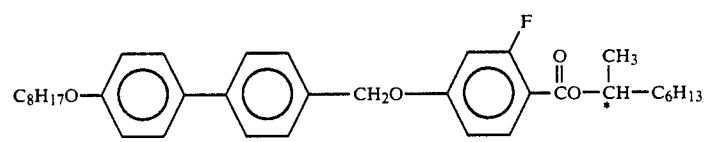
(B21)
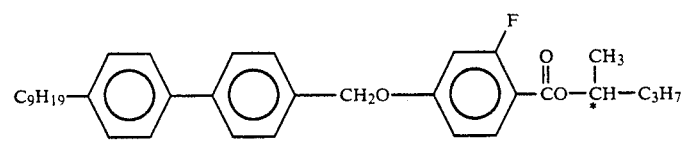
(B22)
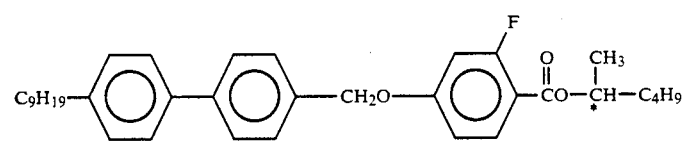
(B23)
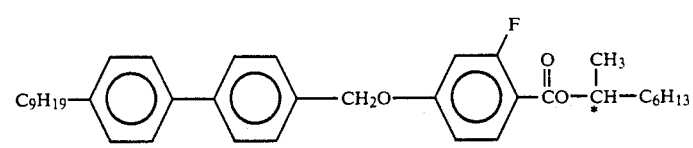
(B24)
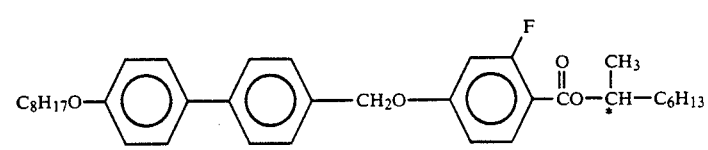
(B25)
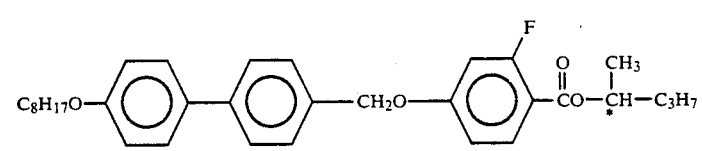
(B26)
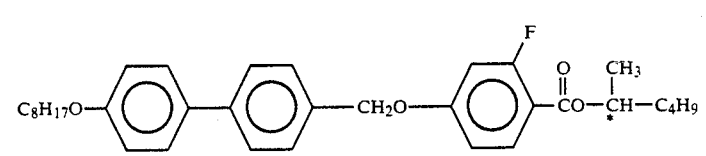
(B27)

-continued
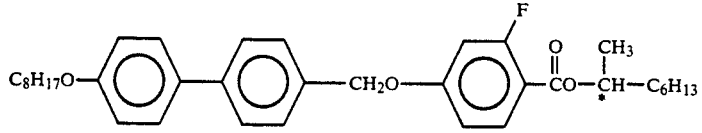 (B28)
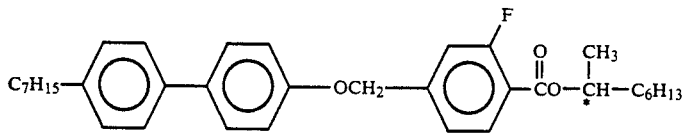 (B29)
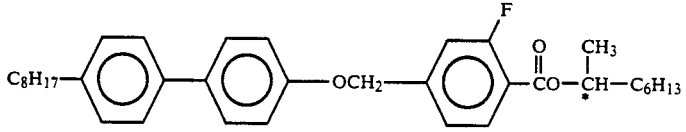 (B30)
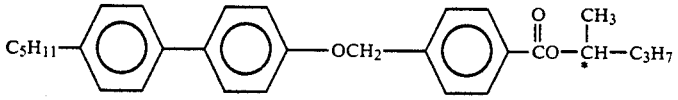 (B31)
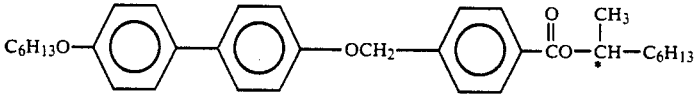 (B32)
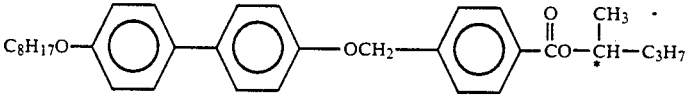 (B33)
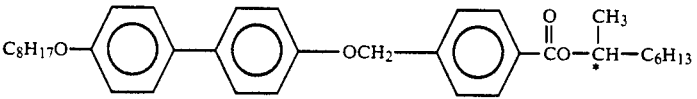 (B34)
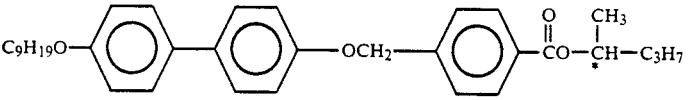 (B35)
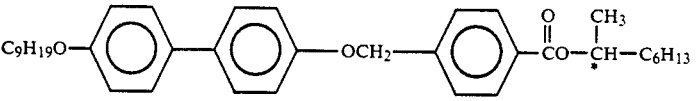 (B36)
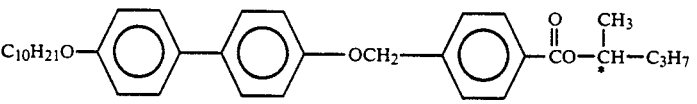 (B37)
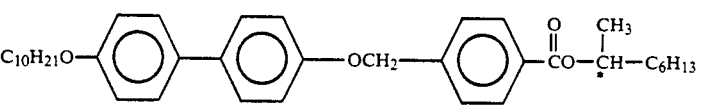 (B38)
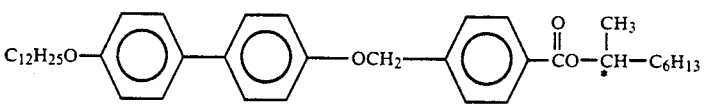 (B39)
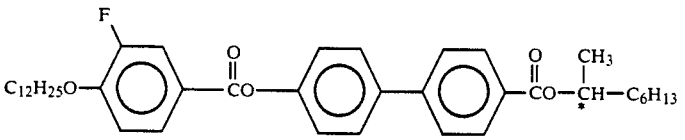 (B40)

-continued

 (B41)

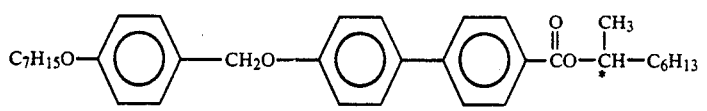 (B42)

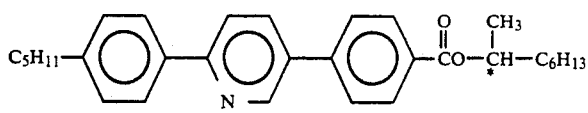 (B43)

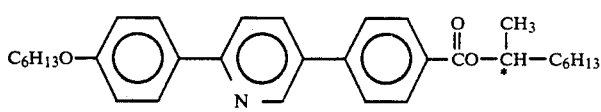 (B44)

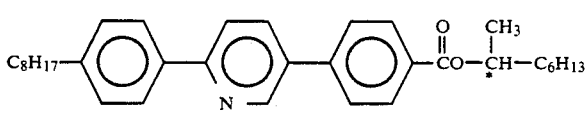 (B45)

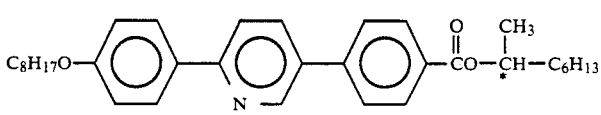 (B46)

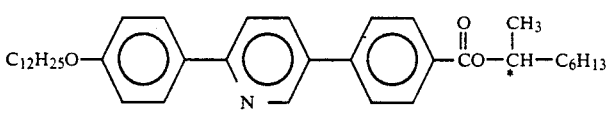 (B47)

In the present invention, as to the mixing proportion of the first component with the second component, the content of the first component is suitably 1 to 40% by weight, preferably 1 to 30% by weight, more preferably 5 to 20% by weight, based upon the total weight of both the components. If the content of the first component having no antiferroelectric phase exceeds 40% by weight based upon the total % by weight, the antiferroelectric phase of the resulting composition is extinct or the upper limit temperature of the antiferroelectric phase lowers. Further, if the proportion of the first component is less than 1% by weight, it is impossible to achieve the reduction of the threshold voltage in the antiferroelectric phase, which is an object of the present invention.

As the second component in the present invention, compounds expressed by the formula (II-1) or (II-2) are preferably used. In the present invention, mixing of a compound expressed by the formula (II-1) with that expressed by the formula (II-2) and use of the mixture as the second component are preferred from the aspect of the response speed of the resulting composition. In this case, it is preferred to use the compound of the second component expressed by the formula (II-1) in a quantity of 30 to 94% by weight based upon the total weight and use the compound of the second component expressed by the formula (II-2) in a quantity of 5 to 40% by weight based upon the total weight.

In addition, many of the compounds expressed by the formula (II-2) have an antiferroelectric phase within a relatively high temperature region; hence it is suitable from the aspect of the antiferroelectric phase temperature region of the resulting composition to render its content as 40% by weight or less, preferably 30% by weight or less, more preferably 20% by weight or less, based upon the total weight.

In SC$_A$* phase, too, which is one of antiferroelectric phases, liquid crystal molecules make a helical structure. Thus, in a liquid crystal display element, it is possible to dissolve the helical structure by making the helical pitch larger than the cell thickness, as in the case of the element of SSFLC. For extending the helical pitch, it is possible to make use of a technique known in ferroelectric liquid crystals. Namely, it is possible to extend the pitch in SC$_A$* phase by mixing components whose helical senses are opposite to each other. The discrimination of the helical sense can be made according to contact method of observing the mixed region of the compound with a compound having a known sense, as in the case of a judgement technique in SC* phase.

In the present invention, even a compound which has by itself no antiferroelectric phase, but when dissolved in SC$_A$* phase, yields a helical structure, is usable as a helical pitch-controlling agent, and it is also usable as a helical pitch-controlling agent without taking the sign of spontaneous polarization value (Ps) of the material into consideration as far as the Ps of the resulting composition is not made zero notwithstanding the sign of Ps.

The antiferroelectric liquid crystal composition of the present invention is characterized in that when the component having an antiferroelectric phase is mixed with the component having no antiferroelectric component, the threshold voltage of the component having an antiferroelectric phase in the antiferroelectric phase is lowered. This fact will be explained by way of examples described below.

The compound of the above-mentioned formula (B 10) disclosed in Japanese patent application laid-open No. Hei 1-213,390 and Japanese patent application No. Hei 3-211,661 has the following phase transition points during the course of the temperature elevation:

C 30 $SC_A^*$ 65.6 $SC_\gamma^*$ 71.2 SC* 81.3 SA 92.2 I and has an antiferroelectric phase ($SC_A^*$ phase). Herein, C, $SC_\gamma^*$, SA and I respectively represent crystal, ferrielectric phase, smectic A phase and isotropic liquid phase, and the numerals represent phase transition points in centigrade.

When the antiferroelectric phase is transitted to the ferroelectric phase by impressing a direct current electric field onto the above compound in the $SC_A^*$ phase, the temperature-dependency of the threshold voltage at that time is shown in FIG. 1. In this figure, Tc: the upper limit temperature of $SC_A^*$ phase; T: measured temperature; Vth: threshold voltage at the time of transition from antiferroelectric phase to ferroelectric phase, expressed by electric field strength (V) per the thickness, 1 μm of the liquid crystal layer.

A compound having no antiferroelectric phase, expressed by the above formula (A3) (10 parts by weight) was added to the compound (B10) (90 parts by weight) to prepare a mixture (a). The compound (A3) has the following phase transition points:

C 30 (SC* 17.1 SA 26.0) I and the compound has no antiferroelectric phase.

Herein, the symbol ( ) means monotropic phase transition. In the description mentioned below, the phase transition points in the parentheses similarly means that the phase transition is monotropic.

The phase transition points of the mixture (a) are as follows:

C 14 $SC_A^*$ 57.5 $SC_\gamma^*$ 64.3 SC* 69.2 SA 85.3 I

The temperature-dependency of the threshold voltage of the mixture (a) at the time of transition from the antiferroelectric phase to the ferroelectric phase is shown in FIG. 1.

Next, a mixture (b) of compound (B10) (90 parts by weight) with a compound expressed by the formula (B5) (10 parts by weight) was prepared. The phase transition points of the mixture (b) are as follows:

C 10 $SC_A^*$ 74.7 $SC_\gamma^*$ 78.4 SC* 84.6 SA 97.0 I

The temperature-dependency of the threshold voltage of the mixture (b) at the time of transition from the antiferroelectric phase to the ferroelectric phase is shown in FIG. 1.

As seen from the temperature-dependencies of the threshold voltages at the time of transition from the antiferroelectric phase to the ferroelectric phase, in the $SC_A^*$ phases of the three kinds of antiferroelectric liquid crystal materials shown in FIG. 1, the threshold voltage does not lower when compounds having an antiferroelectric phase are mixed with each other, but the threshold voltage lowers when a compound having an antiferroelectric phase is mixed with a compound having no antiferroelectric phase.

The reason why the threshold voltage is lowered by mixing a compound having no antiferroelectric phase, is unclear, but the above-mentioned phenomenon has been confirmed by mixing examples of compounds having no antiferroelectric phase.

For the light-switching element of the present invention, it is possible to use a cell provided with two transparent electrodes opposed to each other, and each having a coated film, the surface of which is aligned by rubbing, as in the case of conventional SSFLC mode element, but it is preferred from the aspect of alignment of $SC_A^*$ phase to use a cell composed of a pair of substrates wherein rubbing has been applied onto only one surface thereof. The light-switching element of the present invention is characterized in using a liquid crystal material having a low threshold voltage at the time of transition from the antiferroelectric phase to the ferroelectric phase by impressing an electric field, in the antiferroelectric phase. Further, in the light-switching element of the present invention, it is possible to use an antiferroelectric liquid crystal composition having a dichroic dyestuff added in order to broaden its viewing angle.

The present invention further provides a process for lowering the threshold voltage at the time of transition from the antiferroelectric phase to the ferroelectric phase in the antiferroelectric phase of an antiferroelectric liquid crystal. Namely, when 1 to 66% by weight of the compound having no antiferroelectric phase, expressed by the above formula (I) is added to an antiferroelectric liquid crystal, a threshold voltage at the time of transition from the antiferroelectric phase to the ferroelectric phase in the antiferroelectric liquid crystal is lowered.

The proportion of the compound of the formula (I) added is preferably 5 to 20% by weight based upon the component having an antiferroelectric phase.

EXAMPLE

The present invention will be described in more detail by way of Examples, but it should not be construed to be limited thereto.

In Examples and Comparative examples, liquid crystal materials were filled in the form of liquid phase in a cell obtained by rubbing one of a set of glass substrates having coated an aligning film of polyimide onto the substrates each provided with transparent electrodes, the substrates being opposed to each other and having an electrode distance of 5 μm, followed by gradually cooling the resulting liquid crystal cell to make up $SC_A^*$ phase. The threshold electric field at the transition between the antiferroelectric phase and the ferroelectric phase was sought by observing the optical response and the impressed electric field at the time of having impressed a triangular wave of 50 mHz across the liquid crystal, by means of a two-channel oscilloscope, followed by measuring the change in the optical response under an impressed electric field properly selected depending upon the objective threshold field.

EXAMPLE 1

A compound expressed by the above formula (A3) and having no antiferroelectric phase (10 parts by weight) as the first component was mixed with a compound expressed by the above formula (B5) and having an antiferroelectric phase (90 parts by weight) as the second component, to prepare a mixture (1). The transition points of this mixture under the temperature-elevating process were as follows:

C 53 $SI_A^*$ 55.7 $SC_A^*$ 97.4 $SC_\gamma^*$ 98.6 SC* 100.1 SA 130.4 I

The mixture (1) has two antiferroelectric phases. The alignment of this mixture in $SC_A^*$ phase was good.

Figure 2:
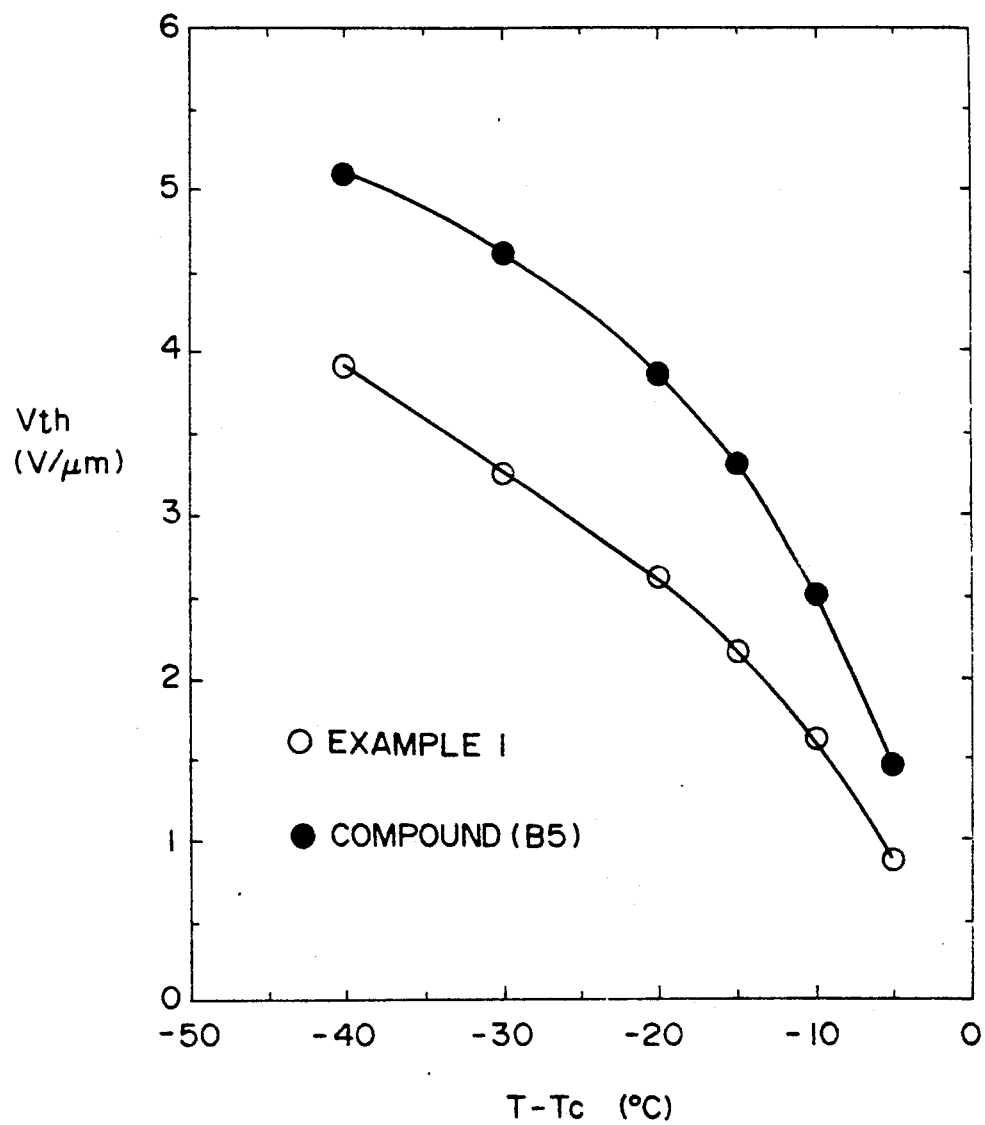

FIG. 2 shows the threshold voltage at the time of transition from the antiferroelectric phase to the ferroelectric phase in the mixture.

In addition, the phase transition points of the compound (B5) were as follows:

C 66 ($SI_A^*$ 65.5) $SC_A^*$ 119.8 $SC_\gamma^*$ 120.8 SC* 122.2 SA 149.8 I

FIG. 2 also shows the threshold voltage at the time of transition from the antiferroelectric phase to the ferroelectric phase in the $SC_A^*$ phase.

EXAMPLE 2

A compound expressed by the formula (A3) (20 parts by weight) as the first component was mixed with a compound expressed by the formula (B5) (80 parts by weight) as the second component to prepare a mixture (2).

The phase transition points during the temperature-elevating process were as follows:

C 61 ($SI_A^*$ 44.7) $SC_A^*$ 74.3 $SC_\gamma^*$ 76.7 SC* 79.2 SA 113.1 I

Further, the alignment of this mixture in $SC_A^*$ phase was good.

Figure 3:
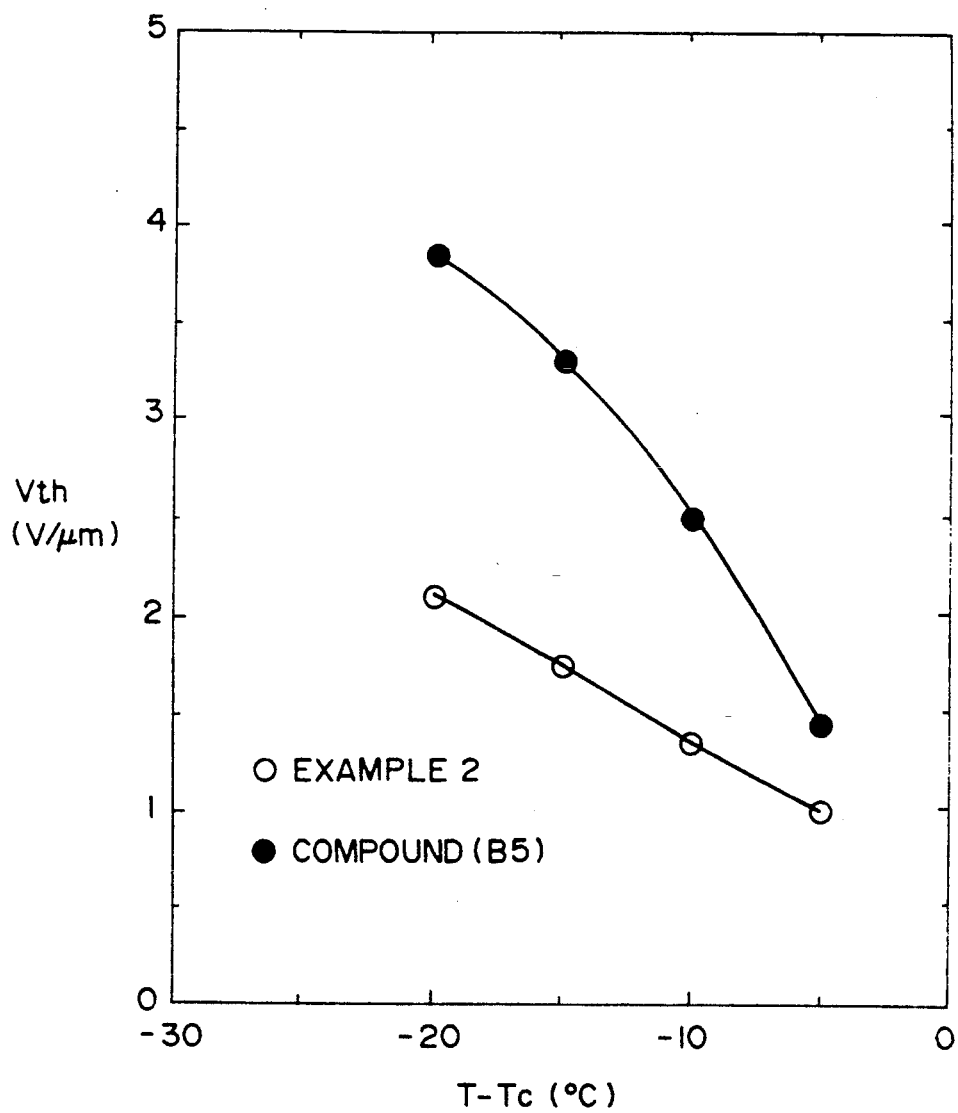

FIG. 3 shows the threshold voltage at the time of transition from the antiferroelectric phase to the ferroelectric phase in $SC_A^*$ phase.

For comparison, the threshold voltage in the $SC_A^*$ phase of the compound (B5) is shown also in FIG. 3.

EXAMPLE 3

A compound expressed by the formula (A19) (10 parts by weight) as the first component was mixed with the above compound (B5) having an antiferroelectric phase (90 parts by weight) to prepare a mixture (3).

The phase transition points of the mixture during the temperature-elevating process were as follows:

C 82 ($SI_A^*$ 67.5) $SC_A^*$ 114.3 $SC_\gamma^*$ 115.1 SA 149.1 I

Figure 4:
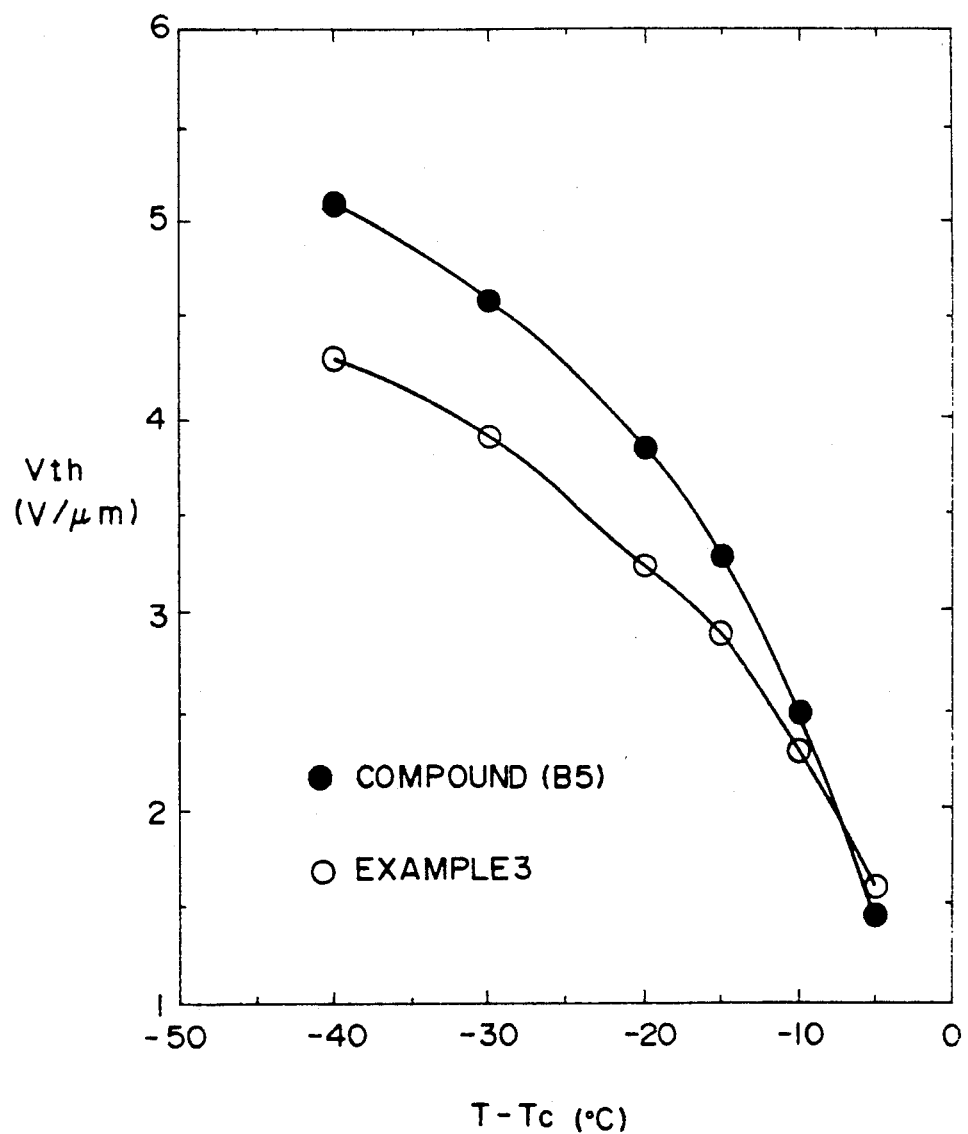

The alignment in the $SC_A^*$ phase was good. FIG. 4 shows the threshold voltage at the time of transition from the antiferroelectric phase to the ferroelectric phase in the $SC_A^*$ phase of the mixture (3) together with the threshold voltage in the same phase of the compound (B5).

EXAMPLE 4

The following compound among those shown in Table 3 (10 parts by weight) as the first component:

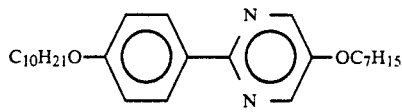

was mixed with the above compound (B5) (90 parts by weight) to prepare a mixture (4).

Figure 5:
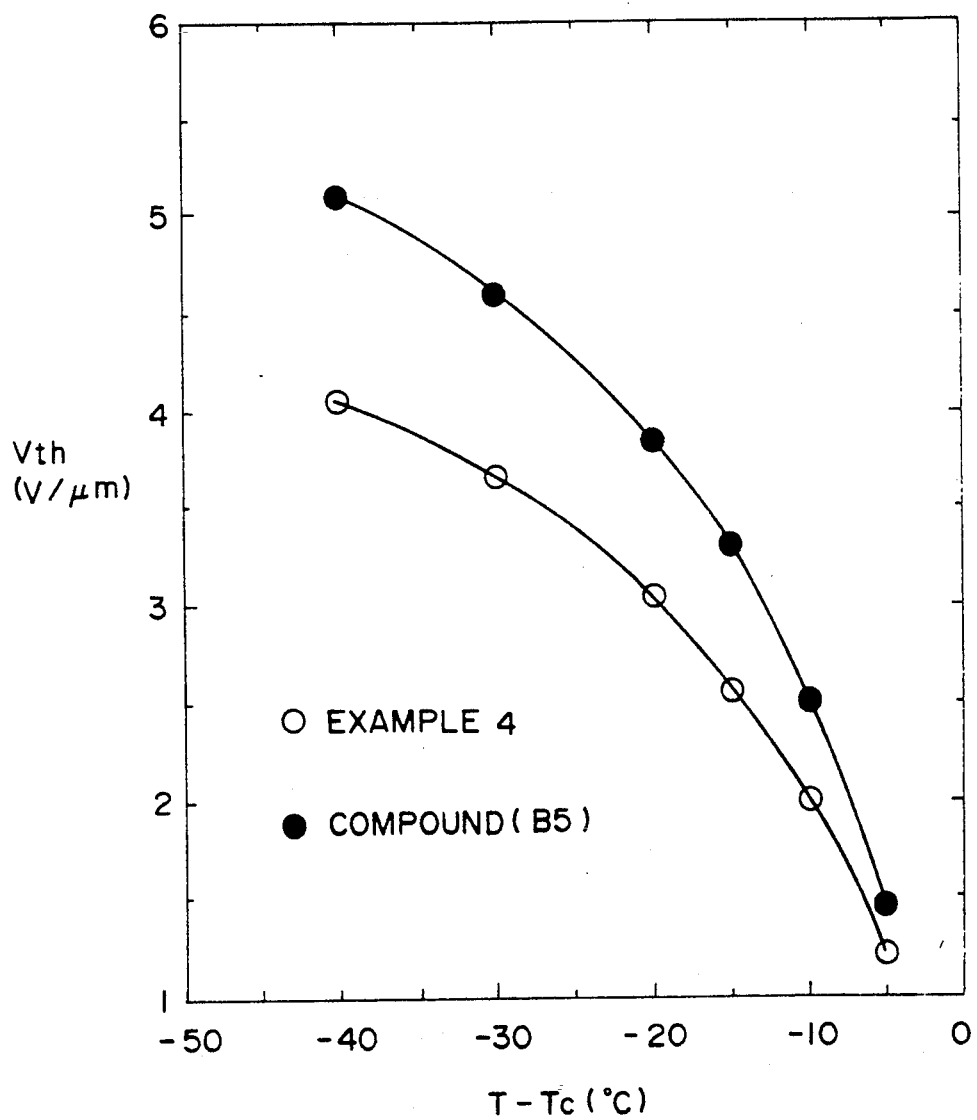

The phase transition points of this mixture during the temperature-raising course were as follows:

C 68 ($SI_A^*$ 61.1) $SC_A^*$ 106.8 $SC_\gamma^*$ 107.9 SA 141.5 I and the alignment in the $SC_A^*$ phase was good. The threshold voltage at the time of transition from the antiferroelectric phase to the ferroelectric phase in the $SC_A^*$ phase of the mixture of (4) are shown in FIG. 5, together with the threshold voltage of the compound (B5).

EXAMPLE 5

Using five compounds expressed by the above formulas (A3), (B5), (B8), (B10) and (B44), a mixture (5) having the following composition was prepared:

| | |
|---|---|
| Compound (A3) | 10% by weight |
| Compound (B5) | 9% by weight |
| Compound (B8) | 36% by weight |
| Compound (B10) | 36% by weight |
| Compound (B44) | 9% by weight |

The phase transition points of the mixture (5) were as follows:

C −36 $SC_A^*$ 68.1 $SC_\gamma^*$ 69.3 SC* 71.3 SA 91.6 1 I

Further, the alignment in $SC_A^*$ phase of the mixture (5) was good.

Figure 6:
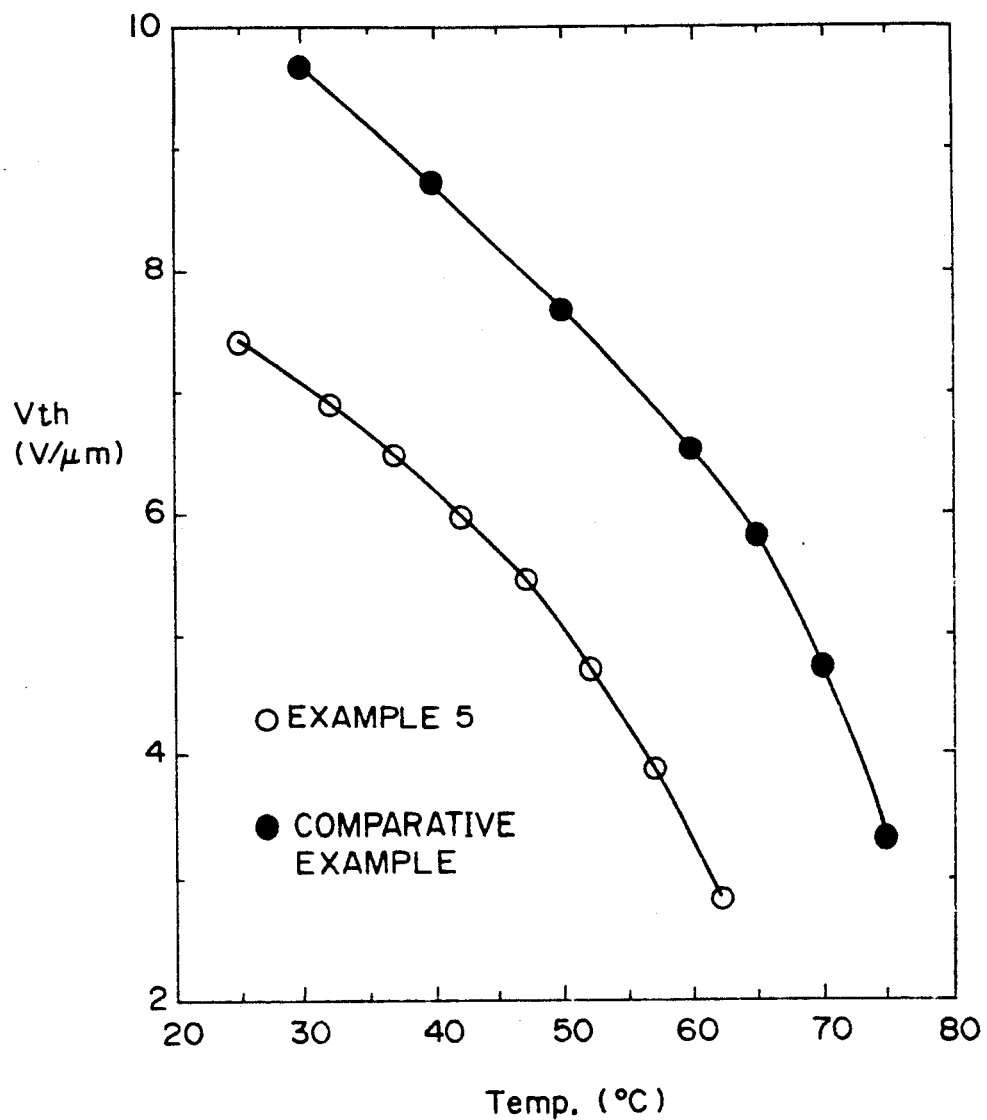

The threshold voltage at the time of transition from the antiferroelectric phase to the ferroelectric phase in $SC_A^*$ phase is shown in FIG. 6.

COMPARATIVE EXAMPLE

Excluding the compound (A3) having no antiferroelectric phase as the first component from the mixture (5) of Example (5), the following mixture (C) was prepared:

| | |
|---|---|
| Compound (B5) | 10% by weight |
| Compound (B8) | 40% by weight |
| Compound (B10) | 40% by weight |
| Compound (B44) | 10% by weight |

The phase transition points of this mixture were as follows:

C −10 $SC_A^*$ 82.2 SC* 83.5 SA 100.6 I

The threshold voltage at the time of transition from the antiferroelectric phase to the ferroelectric phase in the $SC_A^*$ phase of this mixture is shown in FIG. 6.

EXAMPLE 6

Only one of the glass substrates each provided with a set of transparent electrodes having a polyimide aligning membrane applied thereon was subjected to rubbing treatment, followed by opposing a set thereof to each other so as to give a cell gap of 2 μm, to obtain a cell. The antiferroelectric liquid crystal mixture prepared in Example 5 was poured in the above cell to prepare a liquid crystal cell. This liquid crystal cell was placed between two polarizing plates arranged in a crossed nicol state so that the director of the long axes of liquid crystal molecules at the time of absence of electric field could accord with the polarizing direction of the one of the polaring plate, followed by impressing a square wave of 100 Hz and varying the electric field intensity. As a result, a clear switching operation could be observed. The contrast ratio in the optical response was 20:1.

EFFECTIVENESS OF THE PRESENT INVENTION

According to the present invention, a process of further reducing the threshold voltage at the time of transition between the antiferroelectric phase and the ferroelectric phase is provided, and employing the process, an antiferroelectric liquid crystal composition having a lower threshold voltage is provided. Using this composition, a light-switching element capable of effecting a tri-switching and having a good contrast is provided.

What we claim is:

1. An antiferroelectric liquid crystal composition comprising at least three components, the first component of which is at least one compound selected from the group consisting of compounds expressed by the following formula (I-1) or (I-2) and having no antiferroelectric phase, the second component of which is at least one compound selected from the group consisting of compounds expressed by the following formula (II-1) and having an antiferroelectric phase, and the third component of which is at least one compound selected from the group consisting of compounds expressed by the following formula (II-2) and having an antiferroelectric phase, the mixing proportions of said first, second and third components being, by weight, 1to 30%, 30 to 94% and 5 to 40%, respectively;

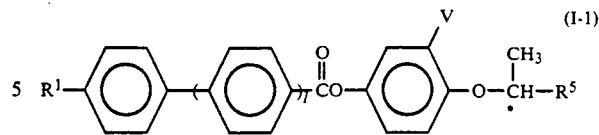
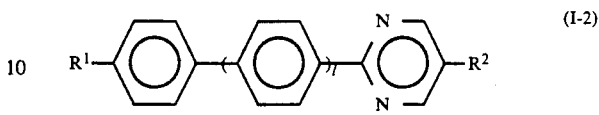
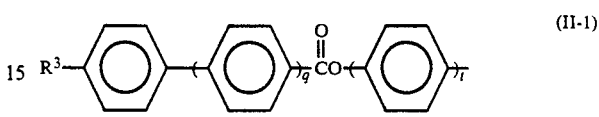
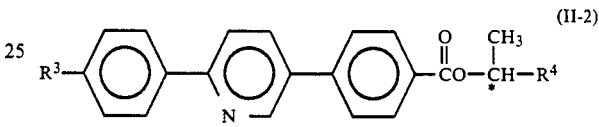

wherein $R^1$ represents a linear alkyl group or alkoxy group of 1 to 18 carbon atoms; $R^2$ represents an alkyl group or alkoxy group of 1 to 18 carbon atoms; $R^3$ represents a linear alkyl group or alkoxy group of 1 to 18 carbon atoms; $R^4$ represents an alkyl group or alkoxy group of 2 to 18 carbon atoms; $R^5$ represents an alkyl group or alkoxy group of 2 to 18 carbon atoms; V and W each independently represent a hydrogen atom, a halogen atom or a cyano group; l, q and t each represent 0 or 1, and a symbol * indicates an asymmetric carbon atom.

2. A light-switching element characterized by using an antiferroelectric liquid crystal composition as set forth in claim 1.

* * * * *